(12) United States Patent
Chen et al.

(10) Patent No.: US 8,891,420 B2
(45) Date of Patent: Nov. 18, 2014

(54) FUSION OF CELLULAR AND NON-CELLULAR COMMUNICATIONS

(75) Inventors: Wei-Peng Chen, Fremont, CA (US); Akira Ito, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 66 days.

(21) Appl. No.: 13/619,028

(22) Filed: Sep. 14, 2012

(65) Prior Publication Data

US 2014/0078906 A1    Mar. 20, 2014

(51) Int. Cl.
*H04B 7/00*    (2006.01)

(52) U.S. Cl.
USPC .......................................................... 370/310

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| | | | |
|---|---|---|---|
| 2008/0125163 A1 | 5/2008 | Chi et al. | |
| 2011/0044218 A1* | 2/2011 | Kaur et al. | 370/310 |
| 2012/0120821 A1* | 5/2012 | Kazmi et al. | 370/252 |
| 2012/0224485 A1 | 9/2012 | Payyappilly et al. | |
| 2013/0084873 A1* | 4/2013 | Sharony et al. | 455/438 |
| 2013/0088983 A1* | 4/2013 | Pragada et al. | 370/252 |

FOREIGN PATENT DOCUMENTS

WO    WO 2012/099762    7/2012 ............ H04W 36/00

OTHER PUBLICATIONS

International Search Report and Written Opinion; PCT/US2013/057781; pp. 12, Dec. 10, 2013.
3GPP; "Use Case for Network Based Congestion Management and Flow Mobility Based on User Plane Congestion in the RAN"; InterDigital Communications, KDDI; 3GPP TSG-SA WG1 # 58; pp. 3, 2012.
3GPP; "On Inter-site Multi-Point Transmission in HSDPA"; Qualcomm Incorporated; 3GPP TSG RAN WG2 # 75; pp. 5, 2011.
C.B. Sankaran; "Data Offloading Techniques in 3GPP Rel-10 Networks: A Tutorial", IEEE Communication Magazine, Jun. 2012.
WirelessE2E LLC; "Analysis of Traffic Offload : WiFi to Resue": www.wirelesse2e.com; pp. 1-23, Sep. 2010.
Hannu Hietalahti; "3GPP Core Network migration path for HSPA+ and LTE"; www.3gpp.org; pp. 30, May 2010.

* cited by examiner

*Primary Examiner* — Jung-Jen Liu
(74) *Attorney, Agent, or Firm* — Baker Botts L.L.P.

(57) ABSTRACT

A method for wireless communications, includes determining capacity of a non-cellular wireless link associated with a wireless broadcast area, determining congestion of a cellular link associated with the wireless broadcast area, determining a sublayer of a protocol of the cellular link based on the determined non-cellular wireless capacity and the determined congestion, dividing cellular data to be sent between a wireless device and a base station using the protocol of the cellular link into protocol data units of the sublayer, encapsulating the protocol data units of the sublayer into transmission units of the non-cellular link, and sending the resulting transmission units of the non-cellular wireless link.

17 Claims, 6 Drawing Sheets

FUSION OF CELLULAR AND NON-CELLULAR COMMUNICATIONS

TECHNICAL FIELD

The present invention generally relates to wireless communications and, more particularly, to fusion of cellular and non-cellular communications.

BACKGROUND

Wireless communications systems are used in a variety of telecommunications systems, television, radio and other media systems, data communication networks, and other systems to convey information between remote points using wireless transmitters and wireless receivers. A transmitter is an electronic device that, usually with the aid of an antenna, propagates an electromagnetic signal modulated with information such as radio, television, or other signals. A receiver is an electronic device that receives a wireless electromagnetic signal and processes the information modulated thereon. A transmitter and receiver may be combined into a single device called a transceiver.

Wireless communications may be made for many Equipment (UE) devices to be used in a cellular coverage area using one or more base stations. Long-Term Evolution (LTE) and/or Long-Term Evolution-Advanced (LTE-A) networks may be used for fourth-generation (4G) wireless technology communication used to provide communication between and/or among all UEs and a base station, e.g., Evolved Node B (eNB).

SUMMARY

In accordance with one embodiment of the present disclosure, a method for wireless communications, includes determining capacity of a non-cellular wireless link associated with a wireless broadcast area, determining congestion of a cellular link associated with the wireless broadcast area, determining a sublayer of a protocol of the cellular link based on the determined non-cellular wireless capacity and the determined congestion, dividing cellular data to be sent between a wireless device and a base station using the protocol of the cellular link into protocol data units of the sublayer, encapsulating the protocol data units of the sublayer into transmission units of the non-cellular link, and sending the resulting transmission units of the non-cellular wireless link.

In accordance with another embodiment of the present disclosure, an article of manufacture includes a computer readable medium and computer-executable instructions carried on the computer readable medium. The instructions are readable by a processor. The instructions, when read and executed, cause the processor to determine capacity of a non-cellular wireless link associated with a wireless broadcast area, determine congestion of a cellular link associated with the wireless broadcast area, determine a sublayer of a protocol of the cellular link based on the determined non-cellular wireless capacity and the determined congestion, divide cellular data to be sent between a wireless device and a base station using the protocol of the cellular link into protocol data units of the sublayer, encapsulate the protocol data units of the sublayer into transmission units of the non-cellular link, and send the resulting transmission units of the non-cellular wireless link.

In accordance with the another embodiment of the present disclosure, a system or system for wireless communication includes a memory coupled to a processor. The processor is configured to determine capacity of a non-cellular wireless link associated with a wireless broadcast area, determine congestion of a cellular link associated with the wireless broadcast area, determine a sublayer of a protocol of the cellular link based on the determined non-cellular wireless capacity and the determined congestion, divide cellular data to be sent between a wireless device and a base station using the protocol of the cellular link into protocol data units of the sublayer, encapsulate the protocol data units of the sublayer into transmission units of the non-cellular link, and send the resulting transmission units of the non-cellular wireless link.

The object and advantages of the invention will be realized and attained at least by the features, elements, and combinations particularly pointed out in the claims. It is to be understood that both the foregoing general description and the following detailed description are exemplary and explanatory and are not restrictive of the invention, as claimed.

DETAILED DESCRIPTION

Embodiments of the present invention and its advantages are best understood by referring to FIGS. 1-6 of the drawings, like numerals being used for like and corresponding parts of the various drawings.

Figure 1:
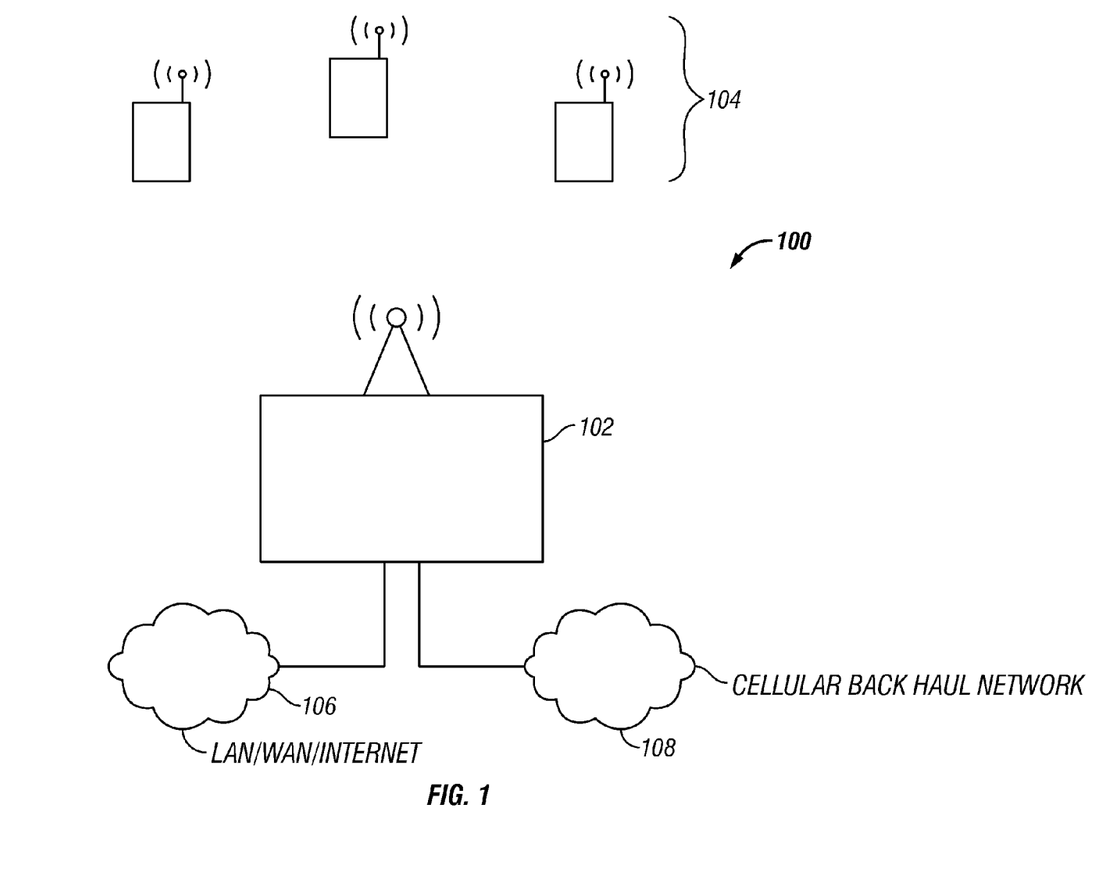
FIG. 1 is an illustration of an example embodiment of a cellular network for fusion of cellular and non-cellular communications.

FIG. 1 is an illustration of an example embodiment of a cellular network 100 for fusion of cellular and non-cellular communications. Network 100 may include one or more base stations 102 that communicate with one or more endpoints 104 via wireless communication methods. Network 100 may provide wireless coverage for any suitable number of endpoints 104 over a geographic area such as cell. Base station 102 may be used to provide wireless coverage for any suitable coverage area or cell, such as an entire building, a city block, a campus, or any other area. In one embodiment, the cell may include a femtocell. In another embodiment, the cell may include a picocell. Network 100 may be configured to utilize wireless communication methods including cellular-based and non-cellular based wireless methods. In one embodiment, network 100 may be configured to dynamically switch between utilizing cellular-based and non-cellular based methods. In another embodiment, network 100 may be configured to simultaneously use cellular-based and non-cellular based methods. Any suitable cellular-based wireless method may be used, such as Code Division Multiple Access (CDMA), Wideband CDMA, (WCDMA), Long-Term Evolution (LTE) and/or Long-Term Evolution-Advanced (LTE-A) methods. Any suitable non-cellular-based wireless method may be used, such as Wi-Fi, Super Wi-Fi, ZigBee, television white space (TVWS), wireless local area network (WLAN), or one or more of the Institute of Electrical and Electronics Engineers (IEEE) 802 family of standards (such as 802.11 or 802.22). In one embodiment, base station 102 may implement a combination LTE femtocell and Wi-Fi hotspot.

As used herein, base station 102 may refer to a transmission site, a remote transmission site, a Radio Element Control, an Evolved Node B (eNB), a Baseband Unit, a Radio Element, or a Remote Radio Head (RRH). Base station 102 may include any combination of hardware, software embedded in a computer readable medium, and/or encoded logic incorporated in hardware or otherwise stored (e.g., firmware) to implement any number of communication protocols that allow for wired or wireless exchange of information in network 100. Base station 102 may be configured to send control signals and data traffic to endpoints 104, using any suitable protocol, including cellular or non-cellular wireless communication methods. Base station 102 may be configured to send traffic from endpoints 104 to one or more networks, such as a cellular backhaul network 108 or to a network 106 including a local-area-network, wide-area-network, the Internet, or a combination thereof. Base station 102 may use any suitable technologies or protocols, e.g., Common Public Radio Interface (CPRI), or Transport Control Protocol/Internet Protocol (TCP/IP) to communicate with other base stations 102.

Endpoint 104 may include or be implemented by any suitable type of wireless device able to send and receive data and/or signals to and from other endpoints 104, base station 102 directly, and/or base station 102 via one or more other base stations 102. Some examples of endpoints 104 include desktop computers, PDAs, cell phones, laptops, VoIP phones, wireless measurement devices, wireless sensors, and/or Machine User Equipment (UE). Endpoints 104 may be configured to communicate with base station 102 through both wireless cellular and wireless non-cellular methods as described above.

Endpoints 104 may provide data or network services to a human and/or machine user through any suitable combination of hardware, software embedded in a computer readable medium, real-time processing system, and/or encoded logic incorporated in hardware or otherwise stored (e.g., firmware). Endpoints 104 may also include unattended or automated systems, gateways, other intermediate components or other devices that may send or receive data and/or signals. Various types of information may be sent to or from endpoints 104.

Base station 102 may be configured to dynamically determine whether to conduct communication with a given endpoint 104 using cellular-based communication, non-cellular-based communication, or a combination of both, based on one or more conditions of system 100, such as: the number of endpoints 104, the various instant communications requirements of endpoints 104, non-cellular channel conditions, cellular access conditions, a probability of successful transmission using a given method between an endpoint 104 and base station 102, the number of endpoints 104 configured for non-cellular access, congestion indices of cellular access, and capacity of non-cellular access. Base station 102 may be configured to identify to a given endpoint 104 whether cellular-based communication, non-cellular-based communication, or a combination of both will be used.

In one embodiment, communication between an endpoint 104 and entities within cellular backhaul network 108 maybe seamless, regardless of the communication mechanism used between endpoint 104 and base station 102. For example, network traffic generated by endpoint 104 through non-cellular based communication may appear, in the perspective of cellular backhaul network 108, to be normal cellular traffic such as LTE traffic. Furthermore, network traffic to be sent to endpoint 104 may appear, in the perspective of cellular backhaul network 108, to be normal cellular traffic such as LTE traffic. Such normal cellular traffic may include traffic as would be typically expected to be sent to or received from endpoint 104 and base station 102 and cellular backhaul network 108.

Figure 2:
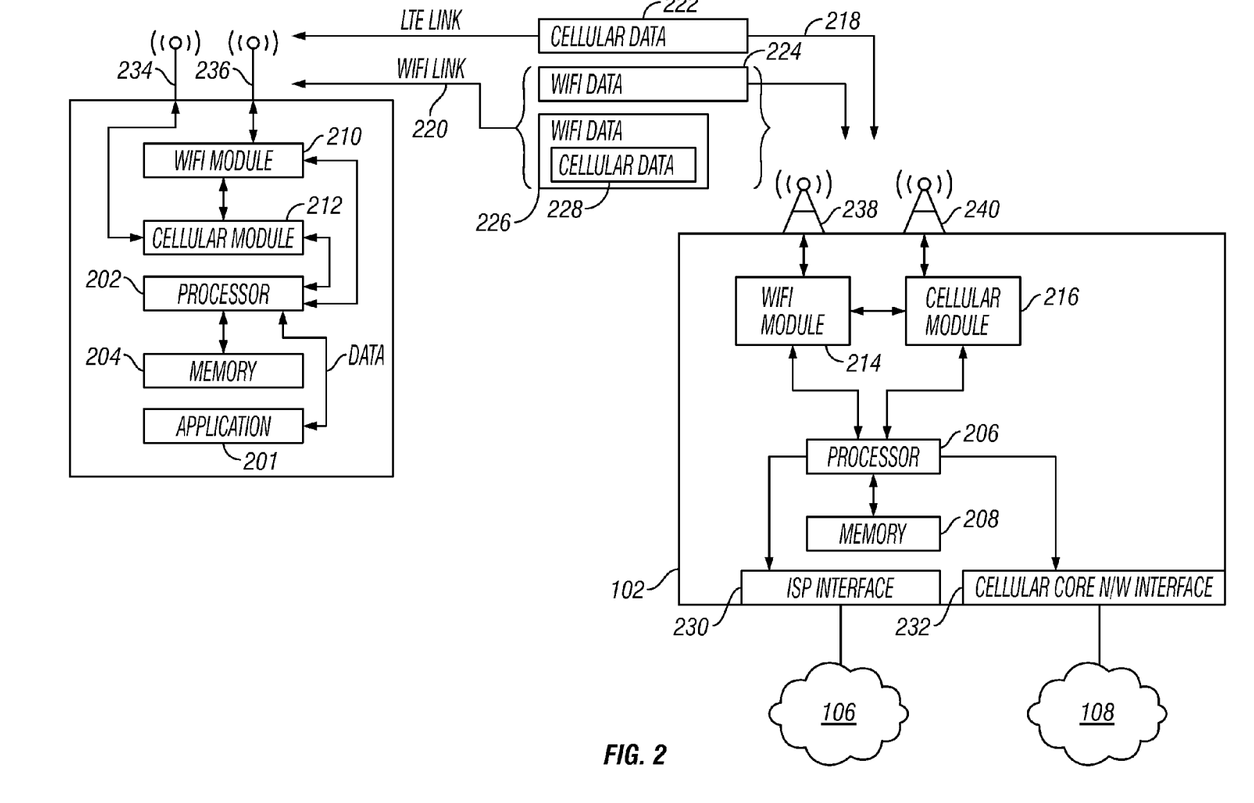
FIG. 2 is a more detailed illustration of example embodiments of an endpoint and a base station and the operation of each.

FIG. 2 is a more detailed illustration of example embodiments of endpoint 104 and base station 102 and the operation of each.

Endpoint 104 may include an application 201 resident within a memory 204 and configured to execute on endpoint 104. Application 201 may include any suitable process, script, executable, application, file, module, library, or other digital entity including instructions for execution by a processor to provide functionality to a user of endpoint 104. For example, application 201 may include a telephonic voice application or a web-browsing application. Endpoint 104 may include a processor 202 coupled to memory 204. Memory 204 may include instructions for execution by processor 202 which, when executed, cause the operation of endpoint 104 as described herein. Endpoint 104 may include a Wi-Fi module 210 communicatively coupled to a cellular module 212. Wi-Fi module 210 may be configured to facilitate communications via any suitable non-cellular wireless communication method, including Wi-Fi, Super Wi-Fi, television white space (TVWS), wireless local area network (WLAN), or one or more of the Institute of Electrical and Electronics Engineers (IEEE) 802 family of standards (such as 802.11 or 802.22). Furthermore, Wi-Fi module 210 may be configured to send or receive such non-cellular wireless communication signals on behalf of endpoint 104 through antenna 234 to other entities, such as base station 102. Cellular module 212 may be configured to facilitate communications via any suitable cellular communications method, including LTE or LTE-A. Furthermore, cellular module 212 may be configured to send or receive such cellular wireless communication signals on behalf of endpoint 104 through antenna 236 to other entities, such as base station 102.

Base station 102 may include a processor 206 coupled to a memory 208. Memory 208 may include instructions for execution by processor 206 which, when executed, cause the operation of base station 102 as described herein. Base station 102 may include a Wi-Fi module 214 communicatively coupled to a cellular module 216. Wi-Fi module 214 may be configured to facilitate communications via any suitable non-cellular wireless communication method, including Wi-Fi, Super Wi-Fi, television white space (TVWS), wireless local area network (WLAN), or one or more of the Institute of Electrical and Electronics Engineers (IEEE) 802 family of standards (such as 802.11 or 802.22). Furthermore, Wi-Fi module 214 may be configured to send or receive such non-cellular wireless communication signals on behalf of base station 102 through antenna 238 to other entities, such as endpoints 104. Cellular module 216 may be configured to facilitate communications via any suitable cellular communications method, including LTE or LTE-A. Furthermore, cellular module 216 may be configured to send or receive such cellular wireless communication signals on behalf of base station 102 through antenna 240 to other entities, such as endpoints 104.

Base station 102 may include an internet service provider (ISP) interface 230, which may be implemented by any suitable mechanism or module for providing, for example, TCP/IP-based communication with network 106. Base station 102 may be configured to facilitate communication between endpoints 104 and network 106 through ISP interface 230. Base station 102 may include a cellular core network interface 232, which may be implemented by any suitable mechanism or module for providing communication of cellular data information to cellular backhaul network 108. Base station 102 may be configured to facilitate, through cellular core network interface 232, cellular network communication between endpoints 104 and entities within cellular backhaul network 108. In one embodiment, ISP interface 230 and cellular core network interface 232 may be implemented as virtual interfaces or subcomponents within a single physical device, card, or interface. In such an embodiment, cellular backhaul network 108 and network 106 may include different portions of a backhaul network configured to transport data differently from each other.

Processors 202, 206 may include one more systems, devices, or apparatuses configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processors 202, 206 may interpret and/or execute program instructions and/or process data stored in a memory, a hard drive, computer-readable-medium, and/or another component such as memory 204, 208, respectively.

Memories 204, 208 may be configured in part or whole as application memory, system memory, or both. Memories 204, 208 may include any system, device, or apparatus configured to hold and/or house one or more memory modules. Each memory module may include any system, device or apparatus configured to retain program instructions and/or data for a period of time (e.g., non-transitory computer-readable media). Memories 204, 208 may be any form of volatile or non-volatile memory including, without limitation, magnetic media, optical media, random access memory (RAM), read-only memory (ROM), flash memory, removable media, or any other suitable local or remote memory component or components. The various servers, electronic devices, or other machines described herein may contain one or more similar such processors or memories for storing and executing program instructions for carrying out the functionality of the associated machine.

Wi-Fi modules 210, 214 and cellular modules 212, 216 may be implemented in any suitable way to perform the functionality described herein. For example, Wi-Fi modules 210, 214 and cellular modules 212, 216 may each be implemented by a processor, analog or digital circuitry, instructions within a memory, an application, a library, a shared library, a function, software, or firmware.

One or more communication links may be established between a given endpoint 104 and base station 102. The number of communication links may include up to one communication link each for each method or protocol of communication enabled by endpoint 104 and base station 102. In one embodiment, endpoint 104 and base station 102 may be configured to establish at least one cellular link and one non-cellular link. Any suitable cellular communication link and non-cellular communication link may be established. For example, endpoint 104 and base station 102 may be configured to establish LTE link 218 and Wi-Fi link 220. Depending upon a determined mode of operation, endpoint 104 and base station 102 may be configured to communicate with each other utilizing LTE link 218 alone, LTE link 218 in combination with Wi-Fi link 220, or Wi-Fi link 220 alone.

LTE link 218 may be configured to transport cellular information between endpoint 104 and base station 102 through respective cellular modules 212, 216 and antennae 234, 240. Such cellular information may implemented according to the wireless protocol used for communication, such as LTE or LTE-A. For example, the specific division of data to be sent along LTE link 218 into physical data units (PDU) may be performed according to the wireless protocol specifications of LTE. The cellular information, conforming to the wireless cellular protocol specifications, may be identified as cellular data 222.

Wi-Fi link 220 may be configured to transport information between endpoint 104 and base station 102 through respective Wi-Fi modules 210, 214 and antennae 236, 238. Such non-cellular information may implemented according to the wireless protocol used for communication, such as Wi-Fi, Super Wi-Fi, TVWS, WLAN, or one or more of the IEEE 802 family of standards. For example, the specific division of data to be sent along LTE link 218 into PDUs may be performed according to the wireless protocol specifications of Wi-Fi. The data transported on Wi-Fi link 220 may include Wi-Fi data 224, 226, conforming to the PDU standards of Wi-Fi. In one embodiment, data such as Wi-Fi data 224 may include information to be sent from endpoint 104 to an entity on network 106. In another embodiment, data such as Wi-Fi data 226 may include cellular data 228 in its payload. Cellular data 228 may include information that would otherwise be transported over LTE link 218. In one embodiment, cellular data 228 may include information in the same format, PDU, or other form as cellular data 222. In another embodiment, cellular data 228 may include information that has been modified from the format, PDU, or other form of cellular data 222. For example, cellular data 228 may include cellular information of a different protocol layer than cellular data 222. For a given data transmission stream, base station 102 may determine whether to facilitate communication for the data stream via LTE link 218, Wi-Fi link 220, or both. Furthermore, base station 102 may determine whether use of cellular data 228 within Wi-Fi data 226 in Wi-Fi link 220 is to use data unmodified or modified from its form in cellular data 222 in LTE link 218.

Application 201 may be configured to send network traffic to or from entities within cellular backhaul network 108 or network 106. To facilitate such traffic, Wi-Fi module 210 and cellular module 212 may be configured to determine how to send such information to or from base station 104 over LTE link 218, Wi-Fi link 220, or both. Such a determination may include sending some or all of the information over one or both of the links. The determination may be made based upon the nature of application 201, the nature or content of the data stream (such a voice data, streaming audiovisual data, or text), or various instant characteristics of network 100.

In one embodiment, base station 102 and endpoint 104 may be configured to transport data to be transmitted to network 106 over Wi-Fi link 220 by default. Such default operation may be based upon, for example, the nature or content of the data to be transported, the nature or identity of the associated application 201, or the target network 106. In operation, application 201 may establish communication with an entity in network 106. Endpoint 104 may process information to be sent to the entity in network 106 with Wi-Fi module 210 and send the data over Wi-Fi link 220 as Wi-Fi data 224. Wi-Fi data 224 may be received by Wi-Fi module 214 of base station 102, which may process the information and send it to the entity within network 106 through ISP interface 230. Furthermore, information to be sent to endpoint 104 may be received by base station 102 through ISP interface 230. Base station 102 may process the information with Wi-Fi module 210 and send the data over Wi-Fi link 220 as Wi-Fi data 224. Wi-Fi data 224 may be received by Wi-Fi module 210 of endpoint 104, which may process the information and make it available for application 201.

In another embodiment, base station 102 and endpoint 104 may be configured to transport data to be transmitted to network 108 over LTE link 218 by default. Such default operation may be based upon, for example, the nature or content of the data to be transported (such as voice data or streaming audio-visual data), the nature or identity of the associated application 201 (such as a voice application), or the target network, such as cellular backhaul network 108. In operation, application 201 may establish communication with an entity in cellular backhaul network 108. A cellular communication protocol, such as LTE, may be established for communicating data between application 201 and the entity. Endpoint 104 may process information to be sent to the entity in cellular backhaul network 108 with cellular module 212 and send the data over LTE link 218 as cellular data 222. Cellular data 222 may be received by cellular module 216 of base station 102, which may process the information and send it to cellular backhaul network 108 through cellular core network interface 232. Furthermore, information to be sent to endpoint 104 may be received by base station 102 through cellular core network interface 232. Base station 102 may process the information with cellular module 216 and send the data over LTE link 218 as cellular data 222. Cellular data 222 may be received by cellular module 212 of endpoint 104, which may process the information and make it available for application 201.

In yet another embodiment, base station 102 and endpoint 104 may be configured to transport data to be transmitted to network 108 over LTE link 218 and to offload such traffic under certain conditions to Wi-Fi link 220. Base station 102 may be configured to make decisions about when and how to offload such traffic, and may inform affected endpoints 104. In one further embodiment, such an offload of traffic to Wi-Fi link 220 may be in place of traffic on LTE link 218. In another further embodiment, such an offload of traffic to Wi-Fi link 220 may be in addition to traffic on LTE link 218. The offloading of cellular data 222 may be performed by insertion of cellular data 228 into the payload of Wi-Fi data 226. The simultaneous transmittal of cellular traffic on LTE link 218 and Wi-Fi link 220 may include different data on cellular data 222 and cellular data 228, or redundant data on cellular data 222 and cellular data 228. Furthermore, the form of cellular data 228 within Wi-Fi data 226 may be of the same form as cellular data 222, or the form of cellular data 228 may be of a modified form as cellular data 222. Such modifications may include transmittal of cellular data 228 in a different PDU or different protocol layer.

In operation, base station 102 may determine to offload of some or all of the transport of cellular data 222 between endpoint 104 and base station 102 to Wi-Fi link 220. Base station 102 may determine whether all or some of the cellular data 222 will be offloaded. Furthermore, base station 102 may determine whether cellular data 228 will be redundant in content or different in content than cellular data 222. In addition, base station 102 may determine whether the form of cellular data 228 will be changed in comparison to the form of cellular data 222. Base station 102 may inform endpoint 104 and any other affected user equipment. Base station 102 may use any suitable criteria for making such determinations.

Data to be sent by application 201 to cellular backhaul network 108 may be determined by endpoint 104. Endpoint 104, through cellular module 212, Wi-Fi module 210, or any other suitable portion of endpoint 104, may determine which portions of such data to offload and how such data is to be transformed, if applicable. The resulting cellular data 228 may be placed within the payload of Wi-Fi data 226 and transmitted through Wi-Fi module 210 over Wi-Fi link 220 to base station 102. Wi-Fi module 214 may receive Wi-Fi data 226. In parallel, cellular data 222 may be transmitted over LTE link 218 from cellular module 212 to cellular module 216. Base station 102 may extract cellular data 228 from Wi-Fi data 226. If necessary, base station 102 may transform cellular data 228 into an expected data form (i.e., a PDU), such as that used by cellular data 222. Base station 102 may extract cellular data 222, if necessary, and recombine cellular data 228 and cellular data 222 into a cellular data stream to be sent to the recipient in cellular backhaul network 108. If cellular data 228 is redundant of cellular data 222, base station 222 may utilize cellular data 228 to plug in missing or erroneous portions of cellular data 222, or vice-versa. Such situations may arise when, for example, LTE link 218 is weak. If cellular data 228 is not redundant of cellular data 222, base station 222 may reorder and reorganize the PDUs so that the resulting cellular data stream is coherent. The recipient in cellular backhaul network 108 may receive the same cellular data stream regardless of whether any traffic was offloaded from LTE link 218 to Wi-Fi link 220.

Furthermore, data to be sent to application 201 by cellular backhaul network 108 may be determined by base station 102. Base station 102, through cellular module 216, Wi-Fi module 214, or any other suitable portion of base station 102, may determine which portions of such data to offload and how such data is to be transformed, if applicable. The resulting cellular data 228 may be placed within the payload of Wi-Fi data 226 and transmitted through Wi-Fi module 214 over Wi-Fi link 220 to endpoint 104. Wi-Fi module 210 may receive Wi-Fi data 226. In parallel, cellular data 222 may be transmitted over LTE link 218 from cellular module 216 to cellular module 212. Endpoint 104 may extract cellular data 228 from Wi-Fi data 226. If necessary, endpoint 104 may transform cellular data 228 into an expected data form, such as that used by cellular data 222. Base station 102 may extract cellular data 222, if necessary, and recombine cellular data 228 and cellular data 222 into a cellular data stream to be sent to application 201. If cellular data 228 is redundant of cellular data 222, base station 222 may utilize cellular data 228 to plug in missing or erroneous portions of cellular data 222, or vice-versa. Such situations may arise when, for example, LTE link 218 is weak. If cellular data 228 is not redundant of cellular data 222, base station 222 may reorder and reorganize the PDUs so that the resulting cellular data stream is coherent. Application 201 may receive the same cellular data stream regardless of whether any traffic was offloaded from LTE link 218 to Wi-Fi link 220.

Figure 3:
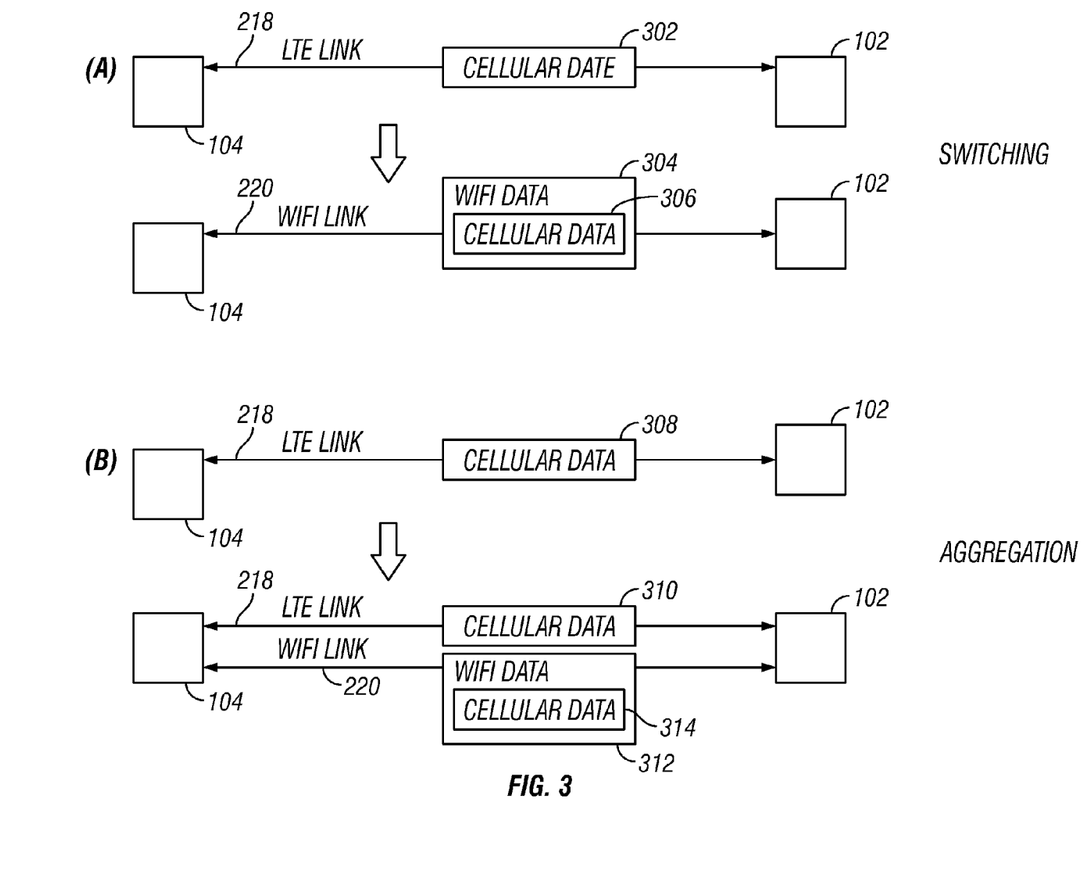
FIG. 3 is an illustration of the operation of an endpoint and a base station to perform switching and aggregation.

FIG. 3 is an illustration of the operation of endpoint 104 and base station 102 to perform switching and aggregation. The operation of endpoint 104 and base station 102 to move all cellular data traffic of a datastream from a cellular link to a non-cellular link may be described as switching. The operation of endpoint 104 and base station 102 to transport cellular data traffic of a datastream over both the cellular link and the non-cellular link may be described as aggregation. In either operation, the cellular data offloaded to the non-cellular link may be modified before being placed into the payload of the non-cellular PDU.

For example, in "(a)", cellular data 302 may be transmitted over LTE link 218 between endpoint 104 and base station 102. Endpoint 104 and base station 102 may apply switching to the transport of cellular data 302 such that the data stream of cellular data 302 is now transported over Wi-Fi-link 220 instead of LTE link 218. The contents of cellular data 302 may now be transported through cellular data' 306, resident within the payload of Wi-Fi data 304. In one embodiment, cellular data 302 and cellular data' 306 are implemented using the same PDU or protocol layer. In such an embodiment, cellular data 302 and cellular data' 306 may be equivalent. In another embodiment, cellular data 302 and cellular data' 306 are implemented using different PDUs or protocol layers. Modification of cellular data' 306 from the form of cellular data 302 may be performed by the sender (i.e., endpoint 104 or base station 102). The recipient of cellular data 306' (i.e., endpoint 104 or base station 102) may obtain cellular data 306's from the payload of Wi-Fi data 304 and reverse the modification of the form of cellular data' 306. Thus, the cellular transport of data between endpoint 104 and base station 102 may be switched to non-cellular transport.

In another example, in "(b)", cellular data 308 may be transmitted over LTE link 218 between endpoint 104 and base station 102. Endpoint 104 and base station 102 may apply aggregation to the transport of cellular data 308 such that the data stream of cellular data 308 may be replicated by or transferred-in-part to Wi-Fi-link 220. The contents of cellular data 308 may now be transported wholly or in part through cellular data' 314, resident within the payload of Wi-Fi data 312. Furthermore, any remaining contents of cellular data 308 may be now be transported in part through cellular data 310. In one embodiment, cellular data 308, cellular data 310, and cellular data' 314 may be implemented using the same PDU or protocol layer. In another embodiment, cellular data' 314 may be implemented using different PDUs or protocol layers that cellular data 308 or cellular data 310. Modification of cellular data' 314 from the form of cellular data 308 may be performed by the sender (i.e., endpoint 104 or base station 102). Redundant operation may include sending both cellular data 310 and cellular data' 314 with equivalent underlying information. Non-redundant operation may include dividing a data stream to be sent into portions, and sending a first portion through cellular data 310 and a second portion through cellular data 314'. The recipient of cellular data 314' (i.e., endpoint 104 or base station 102) may reverse the modification of the form of cellular data' 314. In addition, the recipient may reconcile received cellular data 314' and cellular data 310. In one embodiment, wherein redundant operation is used, endpoint 104 and base station 102 may determine whether any of cellular data 310 or cellular data 314' contain errors or missing information, and fill in such gaps with the other data sample. In another embodiment, wherein non-redundant operation is used, endpoint 104 and base station 102 may determine a coherent ordering or structure of cellular data 314' and cellular data 310, and recombine cellular data 314' and cellular data 310 into a coherent data stream. Thus, the cellular transport of data between endpoint 104 and base station 102 may be aggregated with non-cellular transport.

Base station 102 and endpoint 104 may be configured to perform switching and/or aggregation in the transport of data 406 to data 407. Such a decision may be made by base station 102 and communicated to endpoint 104. The decision to perform switching and/or aggregation may be made in real-time during the processing of information, and may change while transporting a given datastream. In one embodiment, base station 102 may be configured to select aggregation operation by default.

Base station 102 may select aggregation for any suitable purpose. In one embodiment, base station 102 may select aggregation with redundant data between data links in response to a need or desire for higher reliability communication for one or more endpoints. In another embodiment, base station 102 may select aggregation without redundant data between data links in response to a need or desire for higher throughput capacity. Use of the cellular-band portion of the electromagnetic spectrum may be expensive or crowded when compared to use of non-cellular bands of the electromagnetic spectrum. The needs observed by base station 102 may be made of the operation of network 100 or of other portions of a cellular network.

Furthermore, base station 102 may select switching for any suitable purpose. Switching may be selected by base station 102 in response to a need or desire to offload use of cellular-band transmissions. The needs observed by base station 102 may be made of the operation of network 100 or of other portions of a cellular network.

Switching or aggregating may be applied opportunistically. For example, base station 102 may select switching and/or aggregating to offload cellular traffic whenever adequate bandwidth is available on a non-cellular channel. Such switching and/or aggregating may be made by base station 102 even for a short duration. Switching or aggregating may be applied in response to observed conditions. For example, aggregating may be applied in response to determining that endpoint 104 has a poor cellular signal connection such as LTE link 218. In particular, aggregation of modified cellular data over LTE link 218 and Wi-Fi link 220 including portions of the cellular data with hybrid automatic repeat requests (HARQ) may improve the quality-of-signal overall between endpoint 104 and base station 102.

Furthermore, switching or aggregation may be selected according to the nature or content of the data to be sent between base station 102 and endpoint 104. One factor in such selection may include the level of real-time quality-of-service required by the traffic. Any specific quality-of-service may not be available for non-cellular links such as Wi-Fi link 220, compared to LTE link 218. Thus, switching may be applied for applications or data streams that self-correct for errors, or are latency tolerant such as File Transport Protocol (FTP) or Transport Control Protocol (TCP) traffic. Furthermore, switching may be applied, though with less preference, for applications and data streams that can tolerate low error rates but are tolerant of latency, such as buffered video streaming. In addition, switching may be applied, though with less preference, for applications and data streams that can tolerate medium error rates but are require low latency, such as live video conferencing. In contrast, full switching might not be preferred for applications or data streams such as conversational voice, conversational video, or real-time gaming. In such applications, aggregation may yet be usable.

In other implementations of switching between end-to-end use of cellular and non-cellular networks, the destination networks may be required to perform significant accounting and management to switch endpoints and in-between equipment. Such operations may be expensive from a resource perspective and require coordination. Furthermore, delay may be experienced as data streams are switched from one end-to-end process to another. In some embodiments, endpoint 104 and base station 102 may conduct switching and aggregation without knowledge or intervention of other portions of the network, such as cellular backhaul network 108 or network 106. In such embodiments, endpoint 104 and base station 102 may conduct switching and aggregation using cellular data at a lower wireless protocol level. Furthermore, endpoint 104 and base station 102 may conduct switching and aggregation without manual intervention by a user of network 100.

Figure 4:
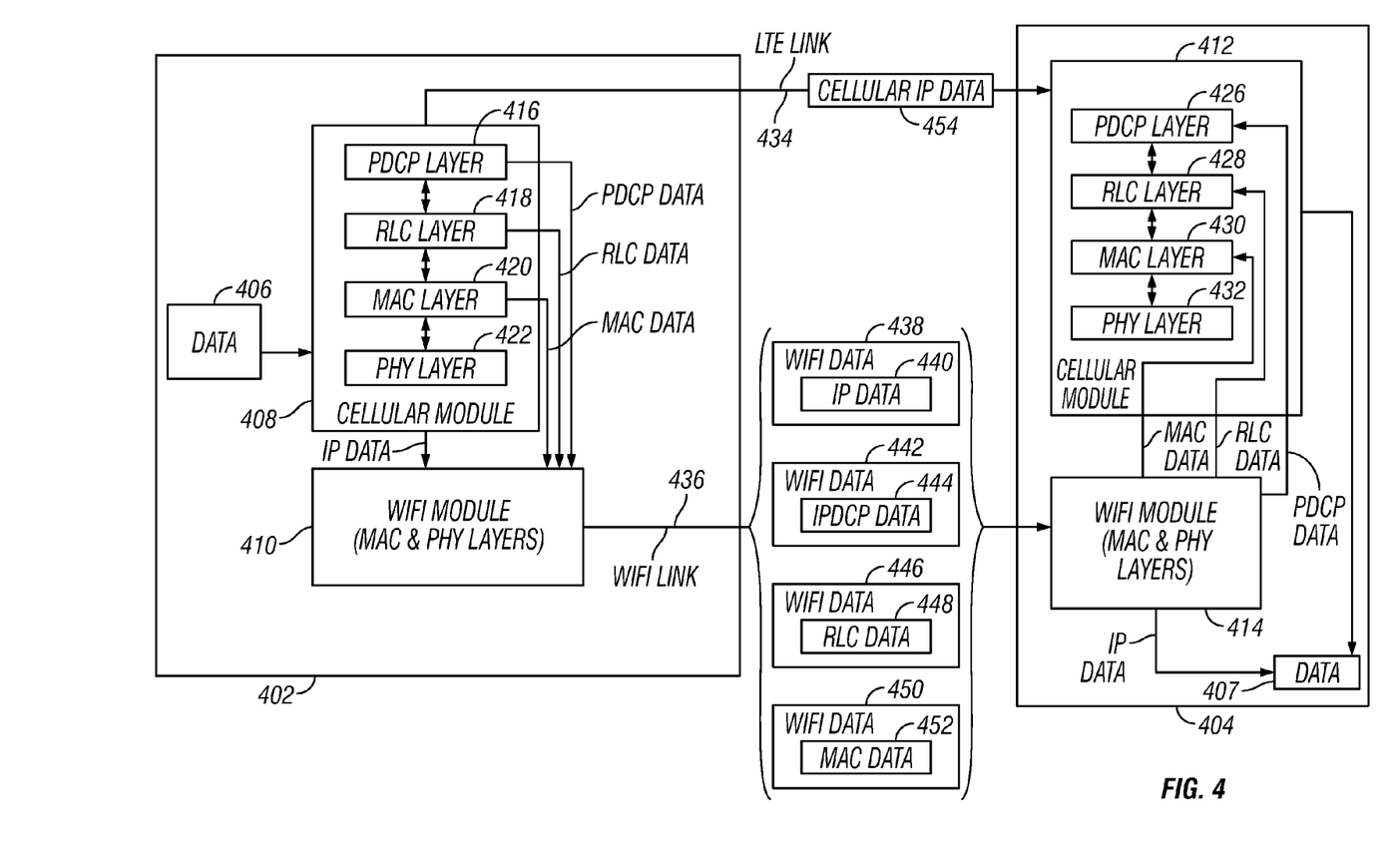
FIG. 4 illustrates the example operation of endpoints and base stations to conduct switching or aggregation in a cellular protocol sublayer.

FIG. 4 illustrates the example operation of endpoints and base stations, such as endpoint 104 and base station 102, to conduct switching or aggregation in a cellular protocol sublayer. Such a sublayer may include an LTE sublayer. Cellular data to be transported across a cellular link may be modified for transport across non-cellular data links.

In one embodiment, sender 402 may be implemented by endpoint 104 and recipient 404 may be implemented by base station 102, wherein Wi-Fi module 410 is a more detailed illustration of Wi-Fi module 210, cellular module 408 is a more detailed illustration of cellular module 212, Wi-Fi module 414 is a more detailed illustration of Wi-Fi module 214, and cellular module 412 is a more detailed illustration of cellular module 216. In another embodiment, recipient 404 may be implemented by endpoint 104 and sender 402 may be implemented by base station 102, wherein Wi-Fi module 410 is a more detailed illustration of Wi-Fi module 214, cellular module 408 is a more detailed illustration of cellular module 216, Wi-Fi module 414 is a more detailed illustration of Wi-Fi module 210, and cellular module 412 is a more detailed illustration of cellular module 212. At various times or modes of operation, each of endpoint 104 and base station 102 may be variably configured to be either sender 402, recipient 404, or both. LTE link 434 may be implemented fully or in part by LTE link 218 and Wi-Fi link 436 may be implemented fully or in part by Wi-Fi link 220.

Sender 402 may be configured to transport data 406 to recipient 404. Data 406 may originate from, for example, application 201 or a recipient in cellular backhaul network 108 and may be configured to be delivered to, for example, a recipient in cellular backhaul network 108 or application 201. Data 407, upon completion of the operation of recipient 404, may be configured to be of the form of cellular data to be transported across LTE link 434.

Cellular module 408 may be configured to process data for transport across cellular links such as LTE link 434 according to a suitable cellular protocol such as LTE or LTE-A. Such processing may include the transformation of data through various layers of the cellular protocol. Such layers may depend upon the specific cellular protocol used. In the example of FIG. 4 for LTE, such layers may include a Physical Layer (PHY) 422, a Media Access Control Layer (MAC) 420 resident above PHY 422, a Radio Link Control (RLC) Layer 418 resident above MAC 420, and a Packet Data Convergence Protocol (PDCP) Layer 416 resident above RLC 418. Such layers may be controlled by cellular module 408. The layers may be configured to provide communication of data that can be provided at an application or user level by, for example, application 201, physically transmitted over a cellular link such as LTE link 434, and reassembled and retransmitted by a recipient. Cellular module 408 may be configured to capture cellular data as it is to be transported over a cellular link such as LTE link 434. Such cellular data may be represented, for example, as cellular IP data 454.

Cellular module 412 may similarly include the ability to parse, convert, or otherwise reorganize data according to various sublayers of the cellular protocol. For example, cellular module 412 may include PDCP 426 resident on top of RLC 428, which may be resident on top of MAC 430, which may be resident on top of PHY 432. Upon receipt of data, cellular module 412 may perform error checking, request missing information, and reassemble the data stream for communication to its destination.

In one embodiment, cellular module 408 may be configured to provide such information to Wi-Fi module 410, which may be configured to place such information as-is into the payload of Wi-Fi data 438. Thus, Wi-Fi module 410 may be configured to transport the equivalent of cellular IP data 454 in IP data 440 resident within Wi-Fi data 438 to Wi-Fi module 414.

In other embodiments, cellular module 408 may be configured to provide cellular data from a cellular protocol sublayer, such as an LTE sublayer, to Wi-Fi module 410, which may be configured to place such information as-is into the payload of Wi-Fi data to be transported over Wi-Fi link 436 to Wi-Fi module 414. Wi-Fi module 414 may be configured to provide the received data to cellular module 412, which may be configured to reconstruct the original data stream and output data 407. Where IP data 440 is communicated from Wi-Fi module 410, Wi-Fi module 414 may be configured to provide IP data as output data 407. Such reconstruction may include reassembly up or down the cellular protocol sublayers. The information taken from a given sublayer may include information as appropriated into PDUs as defined by the cellular protocol.

Sender 402 may be configured to send any suitable cellular protocol sublayer messages to recipient 404 through Wi-Fi link 436. For example, cellular module 408 may provide PDCP 416 messages to Wi-Fi module 410, which may place the PDCP 416 messages into the payload of Wi-Fi data 442 in the form of PDCP data 444. Wi-Fi module 414 may be configured to receive Wi-Fi data 442, extract PDCP data 444, and pass PDCP data 444 to cellular module 412. Cellular module 412 maybe configured to reconstruct the original data stream based on PDCP data 444. To perform such reconstruction, PDCP data 444 may be converted to another layer of the cellular protocol. Furthermore, PDCP data 444, or data resulting from its transformation, may be combined with data received separately, such as data received in cellular IP data 454.

In another example, cellular module 408 may provide RLC 418 messages to Wi-Fi module 410, which may place the RLC 418 messages into the payload of Wi-Fi data 446 in the form of RLC data 448. Wi-Fi module 414 may be configured to receive Wi-Fi data 446, extract RLC data 448, and pass RLC data 448 to cellular module 412. Cellular module 412 maybe configured to reconstruct the original data stream based on RLC data 448. To perform such reconstruction, RLC data 448 may be converted to another layer of the cellular protocol. Furthermore, RLC data 448, or data resulting from its transformation, may be combined with data received separately, such as data received in cellular IP data 454.

In yet another example, cellular module 408 may provide MAC 420 messages to Wi-Fi module 410, which may place the MAC 420 messages into the payload of Wi-Fi data 450 in the form of MAC data 452. Wi-Fi module 414 may be configured to receive Wi-Fi data 4506, extract MAC data 452, and pass MAC data 452 to cellular module 412. Cellular module 412 maybe configured to reconstruct the original data stream based on MAC data 452. To perform such reconstruction, MAC data 452 may be converted to another layer of the cellular protocol. Furthermore, MAC data 452, or data resulting from its transformation, may be combined with data received separately, such as data received in cellular IP data 454.

Sender 402 may be configured to send cellular protocol sublayer messages to recipient 404 through Wi-Fi link 436 in order to conduct aggregation, switching, or both operations. During aggregation, the information underlying the sublayer data, such as PDCP data 444, RLC data 448, or MAC data 452, may be equivalent to the information underlying cellular IP data 454. Furthermore, during aggregation IP data 440 may be equivalent to cellular IP data 454. During switching, the information underlying the PDCP data 444, RLC data 448, MAC data 452, or IP data 440 would have been equivalent to the information underlying cellular IP data 454, except cellular IP data 454 might not be sent.

By converting data from sublayers back to the original intended data stream in recipient 404, the operation in cellular backhaul network 108 and/or network 106 is unaffected by the operations of FIG. 4, as compared to another implementation which merely transports cellular IP data 454 to recipient 404.

Performing switching or aggregation at a given cellular protocol sublayer may provide advantages or disadvantages. The specific choice of which sublayer to utilize for switching or aggregation may be determined by the conditions of a given network implementation, the instant conditions of the network, or empirically.

For example, transmission of cellular data as IP data 440 may avoid use of cellular spectrum protocols. Its implementation may be easier than implementation of transmission of sublayers, due to the reduced coordination required for reassembly. Existing endpoints may be required to be modified at an application or operative system layer. However, given the extra time required to assemble IP data, the efficiency savings may be less than use of sublayers.

In another example, transmission of cellular data as PDCP data 444 may include the advantages of transmission of cellular data as IP data 440, as well as reducing the header overhead of transmission of cellular data such as IP data 440, more secure transmission over Wi-Fi link 436, and no need to an extra procedure to reorder IP packets at recipient 404. In LTE, PDCP may provide security, which allows transmission of such data over Wi-Fi may require less Wi-Fi based security. Header compression may not otherwise be available for Wi-Fi. Further, in-order IP packets of the cellular data, which are then transmitted in-order through Wi-Fi, may avoid buffering and processing that may otherwise occur when transmitting data above PDCP 416. However, modification of existing endpoints may require a change an operating system or firmware level. Further, such transmission is more complex to implement, as the application layer cannot be merely relied upon.

In yet another example, transmission of cellular data as MAC data 452 may include the advantages of transmission of cellular data as IP data 440 and transmission of cellular data as PDCP data 444, as well as being able to perform LTE channel coding, combining blocks received from Wi-Fi and LTE, predictive Wi-Fi payloads, and better throughput from Wi-Fi links. The use in MAC 420 of functions for Hybrid Automatic Repeat Request (HARQ) may provide one or more of these benefits. A transport block of cellular data may be concatenated into code blocks for a Wi-Fi payload. The code blocks may be sent via Wi-Fi payloads and, upon receipt of an acknowledgment, the copy of the code block that was sent may be discarded. If no acknowledgement is sent, the code block may be resent. Recipient 404 may be able to combine different code blocks received over Wi-Fi and LTE links. Furthermore, since the length of the code blocks to be transmitted is known, a scheduler of cellular module 408 scheduler may inform a scheduler of Wi-Fi module 410 of a pending payload with a given length. When Wi-Fi link 436 is sufficiently clear, a request-to-send packet with the proper network allocation vector may be sent immediately. Wi-Fi link 436 may be unable to provide guaranteed service or transmission. Thus, asynchronous operations, such as downlink HARQ usage as opposed to uplink HARQ usage, may be preferable for MAC 420 transmission. However, implementation of such a scheme requires close integration between LTE and the respective MAC and PHY layers of Wi-Fi operations.

RLC 418 may include functions for Automatic Repeat Request (ARQ). Such functions may be best suiting for acknowledge mode bearers. In such cases, the operation of the RLC 418 may be similar to the operation of MAC 420. However, some benefits, such as channel coding, may be unavailable. In one embodiment, the use of RLC 418 for transmission of LTE information may be subsumed by the use of MAC 420.

The decision of which cellular sublayer, if any, to use to transport cellular data through non-cellular channels for aggregation or switching may be made, for example, by base station 102. The decision may be made in real-time based on instant conditions and may be specific to a given endpoint 104. The decision may include, for example, determinations of the congestion of the cellular bands and of the availability of non-cellular capacity.

Given that transmission of cellular data on Wi-Fi link 436 through MAC data 452 may be more efficient than through PDCP data 444, if less capacity is available on Wi-Fi link 436, base station 102 may determine that MAC data 452 is to be used to conduct switching or aggregation. Furthermore, given that that transmission of cellular data on Wi-Fi link 436 through PDCP data 444 may be more efficient than through IP data 440, if less capacity is available on Wi-Fi link 436, base station 102 may determine that MAC data 452 is to be used to conduct switching or aggregation. However, if the capacity available on Wi-Fi link 436 is low enough, base station 102 may determine that none of these should be used to facilitate transmission of cellular data, because the data is unlikely to reach recipient 404. In such a case, no switching or aggregation may be performed.

Given that transmission of cellular data on Wi-Fi link 436 through MAC data 452 may more efficiently offload cellular data than through PDCP data 444 or IP data 440, if LTE link 434 is greatly congested then base station 102 may determine that MAC data 452 is to be used to conduct switching or aggregation. Furthermore, given that transmission of cellular data on Wi-Fi link 436 through PDCP data 444 may more efficiently offload cellular data than through IP data 440, but not as efficiently as through MAC data 452, if LTE link 434 is moderately congested then base station 102 may determined that PDCP data is to be used to conduct switching or aggregation. In addition, given that transmission of cellular data on Wi-Fi link 436 through IP data 440 may be capable of offloading cellular data, but not as efficiently as through use of PDCP data 444 or MAC data 452, if LTE link 434 is lightly congested then base station 102 may determine that IP data 440 is to be used to conduct switching or aggregation. However, if LTE link 434 has no congestion whatsoever, then use of IP data 440, MAC data 452, or PDCP data 444 to aggregate or switch transmission of cellular data may be unnecessary.

Simulation, best-practices, or empirical testing may be used to determine the balance of these considerations to guide the operation of base station 102 to select which, if any, sublayer technique to use when performing switching or aggregation of cellular data through non-cellular links.

Figure 5:
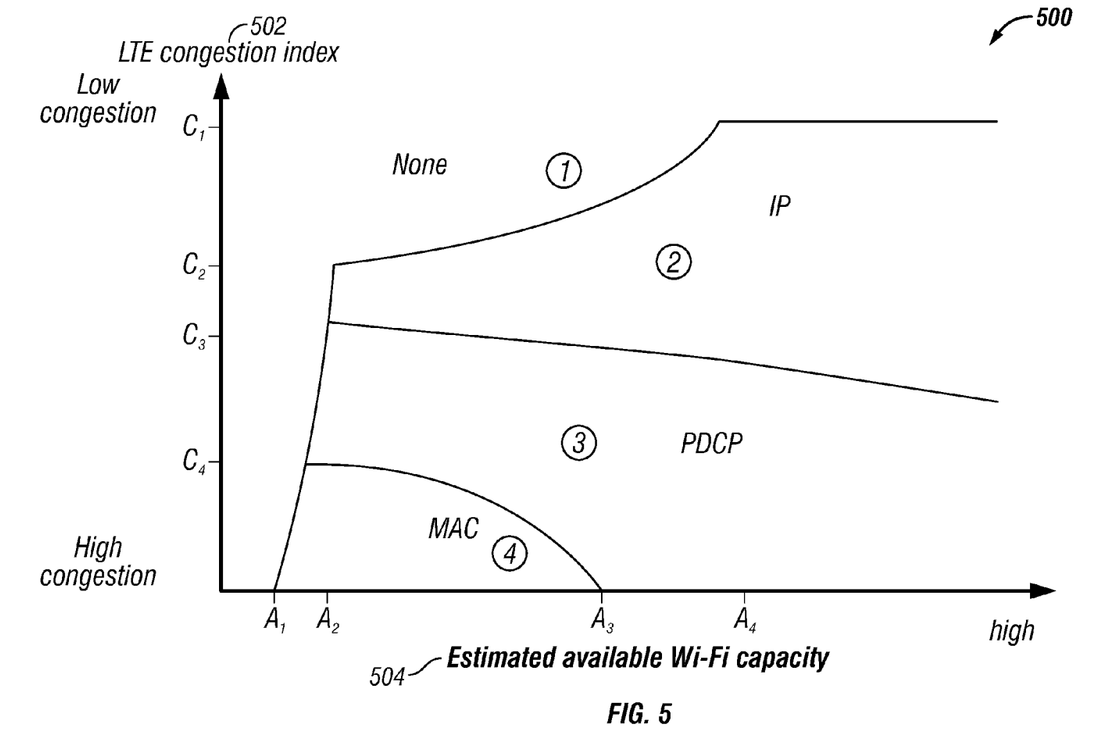
FIG. 5 is an illustration of an example chart for determining which cellular protocol sublayer technique to use when transmitting cellular data through non-cellular data links.

FIG. 5 is an illustration of an example chart 500 for determining which cellular protocol sublayer technique to use when transmitting cellular data through non-cellular data links. Chart 500 illustrates under what conditions base station 102 may determine whether switching and aggregation may utilize a given sublayer, if any. Chart 500 may include an x-axis 504 illustrating available non-cellular capacity, such as Wi-Fi. X-axis 504 may include one or more benchmark values, such as $A_1, A_2, A_3$, and $A_4$. Chart 50 may include a y-axis 502 illustrating congestion of cellular networks, such as an LTE congestion index, from high to low congestion. Y-axis 502 may include one or more benchmark values, such as $C_1$, $C_2$, $C_3$, and $C_4$. Any suitable units, scales, or normalization may be used in conjunction with x-axis 504 and y-axis 502. Chart 500 may illustrate conditions to be evaluated for a given individual endpoint 104.

In (1), below a given availability benchmark $A_1$, or above a given congestion index $C_1$, no sublayer or other switching or aggregation techniques may be used. Furthermore, above a given congestion index $C_2$, no sublayer or other switching or aggregation techniques may be used for available Wi-Fi capacity between $A_2$ and $A_4$ for certain congestion indices. In addition, for available Wi-Fi capacity between $A_1$ and $A_2$, no sublayer or other switching or aggregation techniques may be used for certain congestion indices.

In (2), IP data 440 may be used to conduct switching or aggregation. IP data 440 may be used given that the congestion index is below $C_2$, the Wi-Fi availability is above $A_1$, usage of PDCP data 444 or MAC data 452 would not be more efficient, and usage of any technique is allowed.

In (3), PDCP data 444 may be used to conduct switching or aggregation. PDCP data 444 may be used given that the congestion index is below $C_3$, the Wi-Fi availability is above $A_1$, usage of IP data 440 or MAC data 452 would not be more efficient, and usage of any technique is allowed.

In (4), MAC data 452 may be used to conduct switching or aggregation. MAC data 452 may be used given that the congestion index is below $C_4$, the Wi-Fi availability is between $A_1$ and $A_3$, usage of IP data 440 or PDCP data 444 would not be more efficient, and usage of any technique is allowed.

Figure 6:
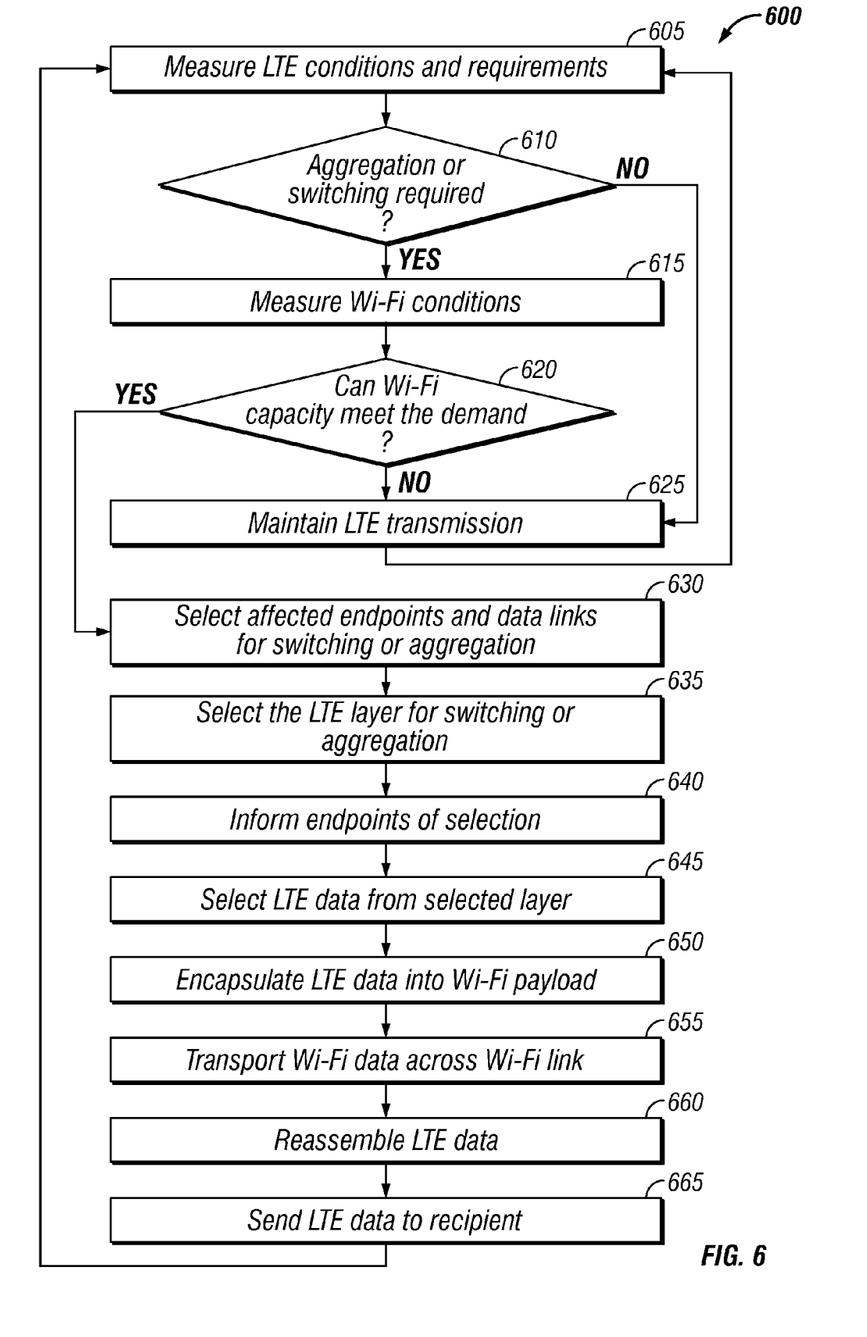
FIG. 6 illustrates a flow chart of an example method for fusion of cellular and non-cellular communication.

FIG. 6 illustrates a flow chart of an example method 600 for fusion of cellular and non-cellular communication. According to certain embodiments, method 600 may begin at step 605. Method 600 may be implemented in a variety of configurations of system 100 as illustrated in FIGS. 1-5. Method 600 may be implemented by hardware, firmware, software, applications, functions, libraries, or other instructions, or any suitable combination thereof. The preferred initialization point for method 600 and the order of the steps comprising method 600 may depend on the implementation chosen. Method 600 may begin in response to any suitable stimulus or trigger. For example, method 600 may be invoked periodically, in response to an alert or determined condition, or manually by a user or supervisor of system 100.

At step 605, cellular conditions, such as LTE conditions, may be measured. Furthermore, requirements such as throughput for the cellular conditions may be determined or measured. Such conditions may include, for example, LTE congestion. It may be determined whether LTE congestion meets certain benchmarks. If so, in step 610 it may be determined that switching may be used to ameliorate the conditions. In another example, it may be determined whether a given endpoint in system 100 requires higher throughput to a destination. If so, in step 610 it may be determined that aggregation may be used to ameliorate the conditions. If switching or aggregation would not be useful, then method 600 proceed to step 625. If switching or aggregation would be useful, then method 600 may proceed to step 615.

In step 615, non-cellular channel conditions, such as Wi-Fi conditions, may be measured. Such conditions may include measuring average Wi-Fi channel idle time, probability of successful transmission, or number of active Wi-Fi users. The availability of Wi-Fi may be quantified.

In step 620, it may be determined whether available Wi-Fi may meet the requirements of switching and aggregation, as determined at least in part by LTE congestion or requirements. If not, method 600 may proceed to step 625. If so, method 600 may proceed to step 630. In step 625, existing transmissions may be maintained. Method 600 may repeat at step 605.

In step 630, affected endpoints and data links associated with the proposed switching or aggregation may be selected. In step 635, an appropriate cellular data layer for switching or aggregation may be selected. Such a cellular data layer may include application-level IP packets for LTE, or an LTE sublayer such as MAC or PDCP. The selection of an appropriate layer may be made considering determinations made in, for example, steps 605 and 615.

In step 640, affected endpoints may be informed of the aggregation and switching decision, as well as the cellular layer at which data will be encapsulated. In step 645, cellular data, such as LTE data, may be selected from the determined layer. Such LTE data may be in the form of PDUs associated with the determined layer. In step 650, the selected LTE data may be encapsulated in the payload of non-cellular wireless data, such as Wi-Fi data. In step 655, the Wi-Fi data may be transmitted across a Wi-Fi link. In parallel, cellular data such as LTE data may be transmitted across an LTE link. In step 660, the cellular data, such as LTE data, may be reassembled into a data stream. In step 665, the resulting data stream may be sent to the intended recipient. Method 600 may repeat at step 605.

Reference to software may encompass one or more applications, bytecode, one or more computer programs, one or more executables, one or more instructions, logic, machine code, one or more scripts, or source code, and vice versa, where appropriate, that have been stored or encoded in a computer-readable storage medium. In some embodiments, encoded software includes one or more application programming interfaces (APIs) stored or encoded in a computer-readable storage medium. Some embodiments may use any suitable encoded software written or otherwise expressed in any suitable programming language or combination of programming languages stored or encoded in any suitable type or number of computer-readable storage media. In some embodiments, encoded software may be expressed as source code or object code. In some embodiments, encoded software is expressed in a higher-level programming language, such as, for example, C, Perl, or a suitable extension thereof. In some embodiments, encoded software is expressed in a lower-level programming language, such as assembly language (or machine code). In some embodiments, encoded software is expressed in JAVA. In some embodiments, encoded software is expressed in Hyper Text Markup Language (HTML), Extensible Markup Language (XML), real time OS (RTOS), or other suitable markup language.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A method for wireless communications, comprising:
determining capacity of a non-cellular wireless link associated with a wireless broadcast area;

determining congestion of a cellular link associated with the wireless broadcast area;

based on the determined non-cellular wireless capacity and the determined congestion, selecting a sublayer of a protocol of the cellular link from a plurality of sublayers of the protocol of the cellular link, wherein:

the selected sublayer includes a Media Access Control (MAC) sublayer; and the MAC sublayer was selected over a Packet Data Convergence Protocol (PDCP) sublayer based on a determination that the capacity of the non-cellular wireless link is less than a given capacity benchmark;

dividing cellular data to be sent between a wireless device and a base station using the protocol of the cellular link into protocol data units of the sublayer;

encapsulating the protocol data units of the sublayer into transmission units of the non-cellular link; and sending the resulting transmission units of the non-cellular wireless link on the non-cellular wireless link.

2. The method of claim 1, wherein the protocol of the cellular link includes Long Term Evolution (LTE).

3. The method of claim 1, wherein the selected sublayer includes at least one of a MAC sublayer or a PDCP sublayer.

4. The method of claim 1, wherein:
the selected sublayer includes a PDCP sublayer; and
the PDCP sublayer was selected over an Internet Protocol (IP) layer based on a determination that the congestion of the cellular link is greater than a given congestion benchmark.

5. The method of claim 1, wherein:
the selected sublayer includes a PDCP sublayer; and
the PDCP sublayer was selected over a MAC sublayer based on a determination that the congestion of the cellular link is less than a given congestion benchmark.

6. An article of manufacture comprising:
a non-transitory computer readable medium; and
computer-executable instructions carried on the computer readable medium, the instructions readable by a processor, the instructions, when read and executed, for causing the processor to:

determine capacity of a non-cellular wireless link associated with a wireless broadcast area;

determine congestion of a cellular link associated with the wireless broadcast area;

based on the determined non-cellular wireless capacity and the determined congestion, select a sublayer of a protocol of the cellular link from a plurality of sublayers of the protocol of the cellular link, wherein:

the selected sublayer includes a Media Access Control (MAC) sublayer; and the MAC sublayer was selected over a Packet Data Convergence Protocol (PDCP) sublayer based on a determination that the capacity of the non-cellular wireless link is less than a given capacity benchmark;

divide cellular data to be sent between a wireless device and a base station using the protocol of the cellular link into protocol data units of the sublayer;

encapsulate the protocol data units of the sublayer into transmission units of the non-cellular link; and send the resulting transmission units of the non-cellular wireless link on the non-cellular wireless link.

7. The article of claim 6, wherein the protocol of the cellular link includes Long Term Evolution (LTE).

8. The article of claim 6, wherein the sublayer includes at least one of a MAC sublayer or a PDCP sublayer.

9. The article of claim 6, wherein:
the selected sublayer includes a PDCP sublayer; and
the PDCP sublayer was selected over an Internet Protocol (IP) layer based on a determination that the congestion of the cellular link is greater than a given capacity benchmark.

10. The article of claim 6, wherein:
the selected sublayer includes a PDCP sublayer; and
the PDCP sublayer was selected over a MAC sublayer based on a determination that the congestion of the cellular link is less than a congestion given benchmark.

11. A system for wireless communication comprising:
a memory;
a processor coupled to the memory, the processor configured to:

determine capacity of a non-cellular wireless link associated with a wireless broadcast area;

determine congestion of a cellular link associated with the wireless broadcast area;

based on the determined non-cellular wireless capacity and the determined congestion, select determine a sublayer of a protocol of the cellular link from a plurality of sublayers of the protocol of the cellular link, wherein the selected sublayer includes a Media Access Control (MAC) sublayer; and the MAC sublayer was selected over a Packet Data Convergence Protocol (PDCP) sublayer based on a determination that the capacity of the non-cellular wireless link is less than a given capacity benchmark;

divide cellular data to be sent between a wireless device and a base station using the protocol of the cellular link into protocol data units of the sublayer;

encapsulate the protocol data units of the sublayer into transmission units of the non-cellular link; and send the resulting transmission units of the non-cellular wireless link on the non-cellular wireless link.

12. The system of claim 11, wherein the protocol of the cellular link includes Long Term Evolution (LTE).

13. The system of claim 11, wherein the sublayer includes at least one of a MAC sublayer or a PDCP sublayer.

14. The system of claim 11, wherein:
the selected sublayer includes a PDCP sublayer; and
the PDCP sublayer was selected over an Internet Protocol (IP) layer based on a determination that the congestion of the cellular link is greater than a given congestion benchmark.

15. The system of claim 11, further comprising a wireless device, wherein:
the wireless device comprises:
a non-cellular wireless interface communicatively coupled to the non-cellular wireless link; and
a cellular wireless interface communicatively coupled to the cellular link; and
the wireless device is configured to:
receive the resulting transmission units of the non-cellular wireless link; and
unencapsulate the protocol data units of the sublayer into transmission units of the non-cellular link.

16. The system of claim 15, wherein the wireless device is further configured to:
receive the determination of the sublayer of a protocol of the cellular link;
divide cellular data to be sent between from the wireless device to a base station using the protocol of the cellular link into protocol data units of the sublayer;

encapsulate the protocol data units of the sublayer into transmission units of the non-cellular link; and send the resulting transmission units of the non-cellular wireless link on the non-cellular wireless link to the base station.

17. The system of claim 16, further comprising a base station configured to:

receive the resulting transmission units of the non-cellular wireless link on the non-cellular wireless link from the wireless device; and unencapsulate the protocol data units of the sublayer into transmission units of the non-cellular link.

* * * * *